Dec. 30, 1930.  R. R. COLLINS  1,787,144
CONDENSER
Filed May 16, 1929
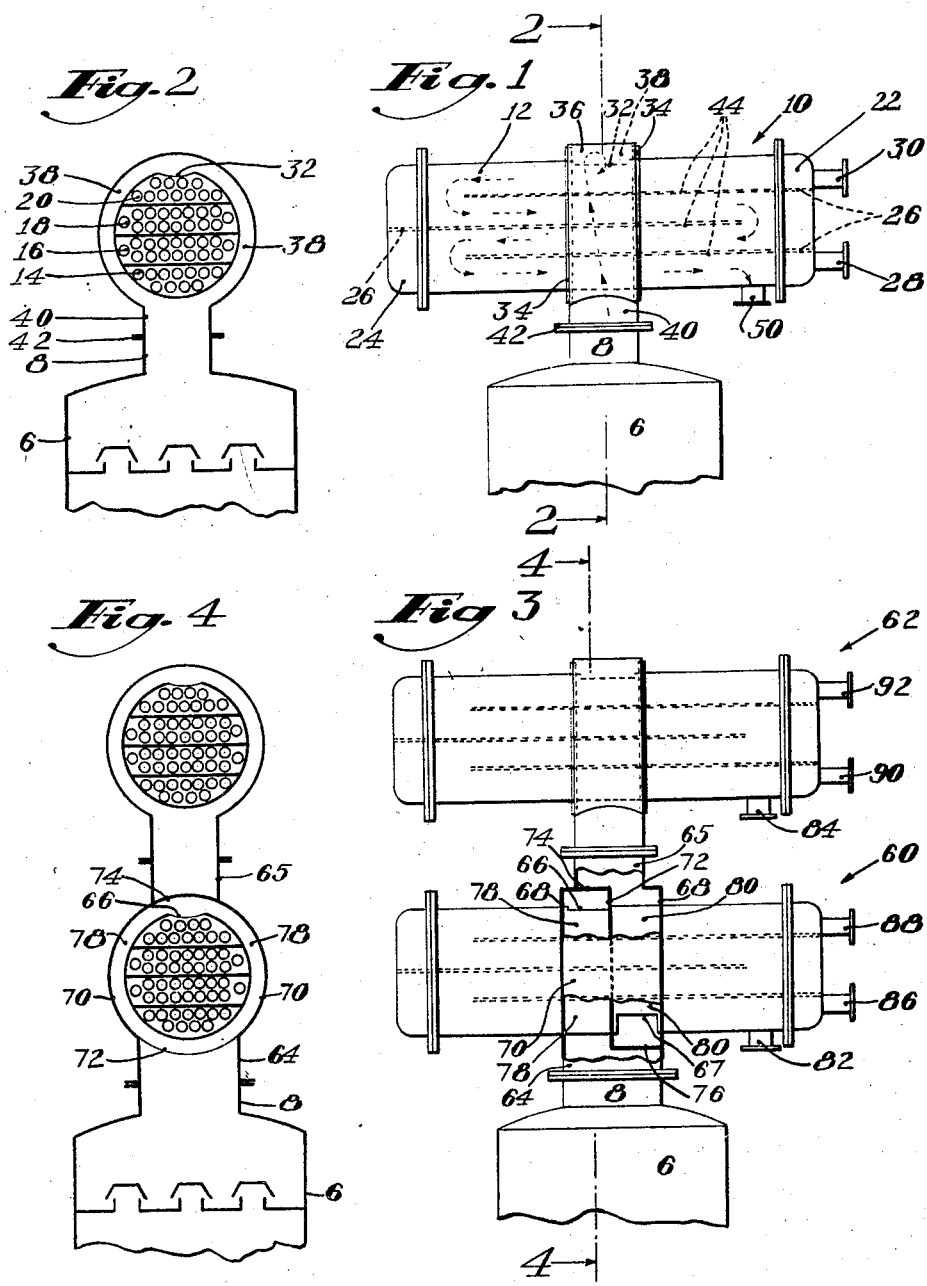

Patented Dec. 30, 1930

1,787,144

UNITED STATES PATENT OFFICE

RAYMOND R. COLLINS, OF NEWTON, MASSACHUSETTS

CONDENSER

Application filed May 16, 1929. Serial No. 363,665.

The present invention relates to condensers and more particularly to condensers for liquefying effluent vapors from a column or tower.

The principal object of the present invention is to provide an overhead or top mounted condenser of simple construction to condense the vapors issuing from the top of a column, in which expensive expansion joint connections are eliminated, and by which undesirable cross flows between the vapors and the condensate are avoided.

A further object of the invention is to provide a top mounted condenser in which desirable countercurrent flows of vapor and cooling liquid may be obtained.

A still further object of the invention is to provide a multi-stage overhead condenser system in which the above-mentioned advantages are likewise obtained.

With these and other objects in view, as will hereinafter appear, the present invention consists of the condenser hereinafter described and particularly defined in the claims.

In the accompanying drawing, Fig. 1 is a side elevation of the preferred form of total condenser embodying the features of the present invention; Fig. 2 is a diagrammatic section on line 2—2 of Fig. 1; Fig. 3 is a side elevation of a two-stage condenser system; and Fig. 4 is a diagrammatic section on line 4—4 of Fig. 3.

In the illustrated embodiment of the invention, particularly as shown in Figs. 1 and 2, a vaporizing column or tower is indicated generally at 6. This tower is of a type useful, for example, in the distillation of petroleum oils. The vapors issue from the tower through an outlet 8. Mounted upon and supported by the outlet 8 is a condenser indicated generally at 10. The condenser is of the horizontal tube type and comprises a cylindrical shell 12 containing a plurality of sets of condenser tubes 14, 16, 18 and 20. The tubes are fitted into manifolds 22 and 24 at the right and left ends respectively of the condenser, as viewed in Fig. 1. The manifolds are provided with the usual partitions 26 to cause the cooling fluid to pass back and forth through the different sets of tubes.

The manifold 22 is provided with a cooling liquid inlet 28 and an outlet 30. In operation, the cooling liquid flows from end to end through the tubes, progressing upwardly from one set to another. In the top of the condenser shell is formed a vapor inlet opening 32. The vapors are conducted from the outlet 8 of the tower to the inlet 32 of the condenser by a vapor conductor which is integrally secured to the shell and which by its attachment to the outlet 8 forms a support for the condenser. On opposite sides of the opening 32, a pair of rings 34 are secured to the condenser shell as by welding. A cylinder 36 forming the outer wall of the conductor is welded to the rings 34, thereby forming an annular conducting space 38 between the shell and the plate. An inlet connection 40 is suitably secured to the bottom of the plate 36. The outlet pipe 8 of the tower and the inlet connection 40 of the condenser are connected together by flanges 42.

Between adjacent sets of condenser tubes, suitable baffles 44 are placed to direct the vapors in the general downward course in tortuous paths over the surfaces of the condenser tubes. The general path of the vapors is indicated by the arrows in Fig. 1. The vapors pass upwardly through the outlet 8 of the tower and the inlet connection 40 of the condenser, where they divide and pass through the conducting spaces 38 surrounding the condenser and into the inlet 32 at the top of the condenser, from which point they flow in horizontal paths and in a general downward direction determined by the baffles. The condensate is drawn off at a draw-off connection 50.

It will be seen that inasmuch as the condenser is supported on the outlet of the tower, there is no necessity for expansion joint connections which are required whenever the condenser is independently supported. Since one wall of the vapor conductor 38 is formed by the shell of the condenser itself, all the parts are subjected to equal strains upon variations in temperature. Moreover, the condenser of the present invention offers advantages over the usual top mounted condenser in that there is no cross flow between the condensate and the vapors. When the vapors are permitted to enter the condenser at the bottom, as in some overhead condenser constructions, the condensate which is progressively formed as the vapors ascend through the condenser, is required to descend by gravity. Thus, the vapors impede the downward flow of condensate until a sufficient pressure builds up to cause the liquid to surge, thereby giving rise to non-uniform flows and widely varying pressures both in the condenser and the column.

It will be seen that the relative directions of flow of vapor and cooling liquid are such as to maintain a desirable countercurrent contact. The hottest vapors contact with the hottest tubes, and the remnant of cooler vapors at the bottom of the condenser contacts with the coolest tubes. Moreover, the general upward direction of cooling liquid, as obtained in the present invention, is highly advantageous because it assists in the sweeping away of gases which tend to collect in the bends, and which might become trapped if the flow of liquid were reversed.

The construction shown in Figs. 3 and 4 employs two condensers. The lower condenser 60 has an inlet connection 64 mounted directly on the outlet 8 of the tower and the upper condenser 62 which is exactly similar to the condenser 10 of Fig. 1, is mounted on an upper vapor outlet 65 of the condenser 60. The shell of the condenser 60 has a top vapor inlet 66, and a bottom vapor outlet 67 through which uncondensed vapors pass to the second condenser. The vapor conductor for the condenser 60 comprises the mounting rings 68 to which is secured the cylinder 70 forming the outer wall of the vapor conductor. This vapor conductor has an intermediate annular partition 72. This partition connects at the top with the vapor outlet 65 by a horizontal partition 74 and at the bottom with the inlet connection by a horizontal partition 76. Thus two separate annular conducting spaces 78 and 80 are provided. The vapors issuing from the outlet 8 of the tower pass through the conducting space 78 to the inlet 66 of the condenser, thence through the condenser 60 from which the condensate is drawn off at 82. Any uncondensed vapors pass through the opening 67 and thence around the annular conducting passage 80 to the outlet 65 of the condenser and into the inlet of the upper condenser 62. A second condensate is drawn off from the outlet 84 of the final condenser. Cooling liquid is admitted to the lower condenser through the inlet 86 and withdrawn at the outlet 88. The final condenser also has an inlet 90 and an outlet 92. The multi-stage system is necessary for fractional condensation or where it is desired to employ different cooling liquids in the separate units. It will be understood that although a two-stage condenser has been shown, a system employing any number of condenser units may be used, in which case the final condenser will be of the form shown at 62 and all other units will be of the form 60.

The multi-stage condenser shown in Figs. 3 and 4 has the advantages of the single condenser of Fig. 1 in so far as it affords a direct overhead support for all of the condensers and consequent freedom from expansion troubles, while still providing the desirable countercurrent flows of vapors and cooling liquids in the different units.

Having thus described the invention, what is claimed is:

1. An overhead condenser for mounting on the top of a column having, in combination, a shell having a vapor inlet opening in the top, tubes in the shell, and a vapor conductor for conveying vapors from the column to the inlet opening, the conductor surrounding and being connected with the shell.

2. An overhead condenser for mounting on the top of a column having, in combination, a shell having a vapor inlet opening in the top, tubes in the shell, and a vapor conductor forming a vapor passage from the column to the inlet opening, the conductor surrounding the shell and integrally connected therewith, the shell forming one wall of the passage.

3. An overhead condenser for mounting on the top of a column having, in combination, a shell having a vapor inlet opening in the top, tubes in the shell, and a vapor conductor integrally connected with the shell to form a vapor passage from the column to the inlet opening, the conductor forming the means for supporting the condenser on the column.

4. An overhead condenser for a column having, in combination, a shell having an inlet opening in the top, a conductor wall surrounding and spaced from the condenser shell to form a vapor passage of which the shell forms one wall, and means connected with said conductor wall for attaching the condenser to a tower.

5. An overhead partial condenser having, in combination, a shell having an inlet opening in the top and an outlet opening in the bottom, and means forming two vapor conducting passages, one communicating with the inlet opening and the other with the outlet opening, the shell forming one wall of each passage, and inlet and outlet connection means for the respective passages.

6. An overhead partial condenser having, in combination, a shell having an inlet opening in the top and an outlet opening in the bottom, a conductor wall surrounding and spaced from the shell, a partition between the wall and the shell dividing the space into two vapor conducting passages, one communicating with the inlet opening and the other with the outlet opening, and inlet and outlet connections for the respective passages.

7. A condenser system for overhead mounting on a column comprising a plurality of condensers each having a shell, a conductor wall surrounding and spaced from the shell, the uppermost condenser shell having an inlet opening in the top and the other condenser shells having inlet and outlet openings in the top and bottom respectively, the spaces between the conductor wall and the shell of each of said other condensers being provided with a partition to form two parallel vapor conducting passages, one communicating with the inlet opening and the other with the outlet opening, and vapor conducting connections for connecting the condensers together and mounting them on the column.

In testimony whereof I have signed my name to this specification.

RAYMOND R. COLLINS.